March 10, 1936.  M. W. GIESKIENG  2,033,424
TIRE CONDITION INDICATOR
Filed Oct. 25, 1934
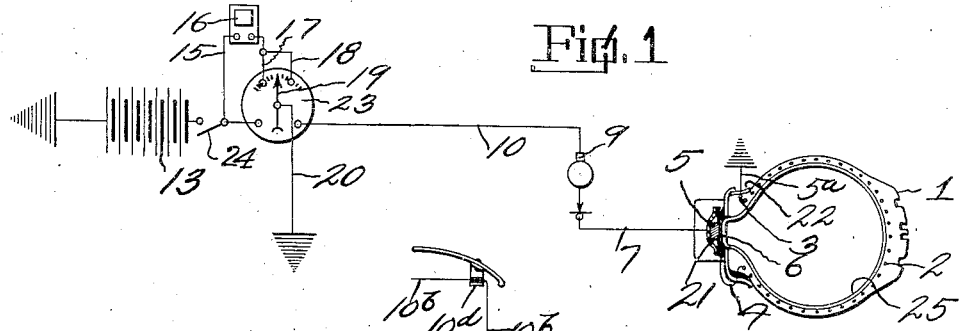
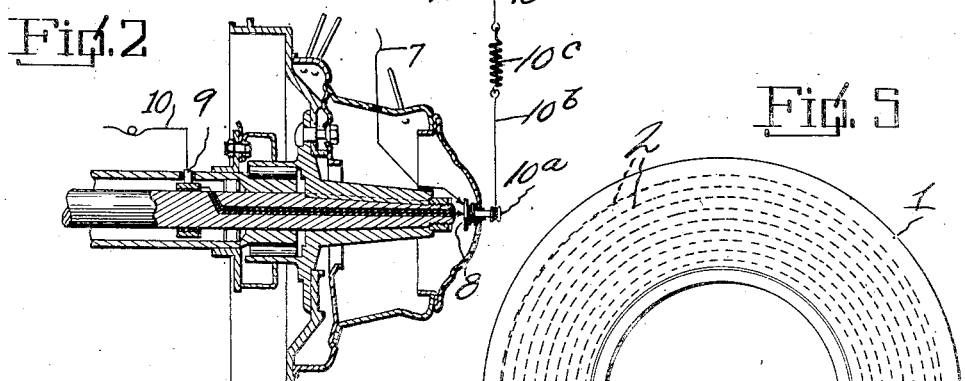
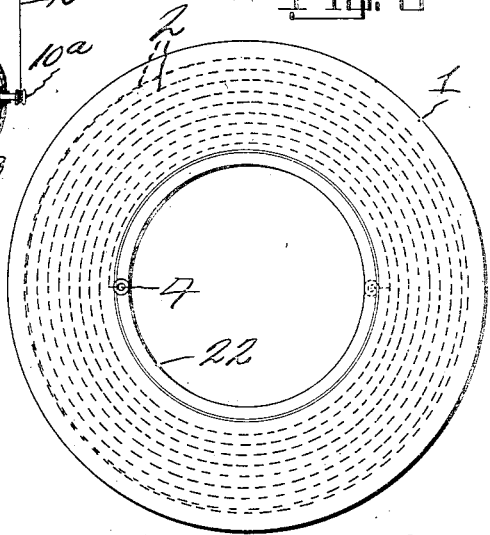
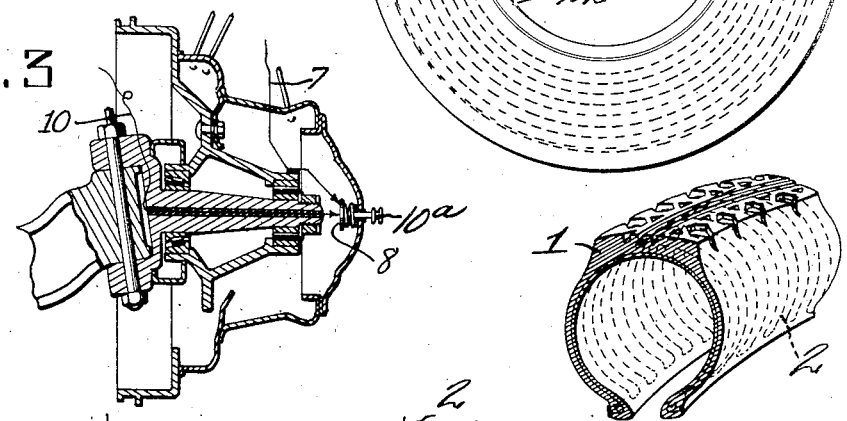
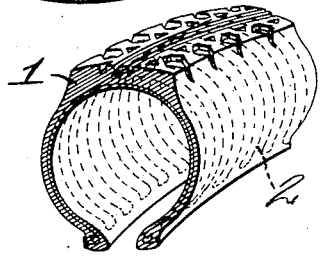
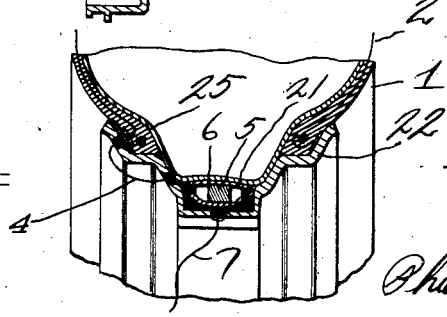
Marion W. Gieskieng
INVENTOR
BY
ATTORNEY Patented Mar. 10, 1936

2,033,424

UNITED STATES PATENT OFFICE 2,033,424

TIRE CONDITION INDICATOR

Marion W. Gieskieng, Little Rock, Ark.

Application October 25, 1934, Serial No. 749,981

1 Claim. (Cl. 177—311)

The invention relates to a tire pressure indicating device and has for its object to provide a device of this kind adapted to be assembled on a motor vehicle, and provided with means whereby, after being installed, will warn the driver of under or over inflation of any of the tires.

A further object is to provide a tire pressure indicator, which will warn the driver of under-inflation caused by a slow leak upon reaching a predetermined minimum pressure.

A further object is to provide the device with an ammeter whose indicating hand forms the blade of the switch furnishing the current to the alarm, upon reaching its minimum or maximum predetermined movement.

A further object is to provide an electrical circuit from the car battery through an ammeter to a variable resistor actuated by the air pressure in the inner tube of the tire, forming the means to cause the alarm, actuated by the hand on the ammeter, at its predetermined minimum or maximum travel.

A further object is to provide the rear axles with brush contacts for conducting the current from the battery to the revolving axles, thence to the variable resistors.

A further object is to provide the rear axles with insulated holes, extending from the insulated brush rings to their outer ends through which the current conveying wire is threaded.

A further object is to provide a point contact between the wire in the axle and the wire leading to the variable resistor.

A further object is to provide the front spindles with insulated holes running therethrough, to receive current carrying wires, making point contacts at their outer ends with wires leading to the variable resistors mounted in the rims of the wheels.

A further object is to provide a contact means between the resistor plate farthest from the current course to a circular contact exposed inwardly, but insulated from the rim.

A further object is to provide the tires with current carrying wires, wound spirally and circumferentially within the tire, starting with an exposed end at the bead of the tire to contact the wire on one side, and ending with an exposed contact with the rim, forming a ground, on the other side of the tire.

A further object is to provide continuous, staggered, transverse wire windings within the fabric of the tire, whereby a fracture of the fabric will break the wire winding, thereby breaking the electrical circuit, causing the hand on the ammeter to reach its maximum limit of travel and divert the current through the alarm, by means of a ground attached to the hand.

A further object is to provide an ammeter circuit for each tire, including the spares, in order that individual readings may be had on any particular tire.

A further object is to provide an arrangement whereby the unit may be conveniently installed on old cars which have not been provided with this unit at the factory.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a wiring diagram of the device connected to the resistor and the cross hatching omitted from the tire for sake of clarity.

Figure 2 is a cross section of the rear wheel hub and axle, showing the brush and current carrying wire in place. Figure 2 also shows an optional form of hook up on old cars.

Figure 3 shows a cross sectional view of the front hub and spindle, with the electrical wiring in place.

Figure 4 is a segmental cross section through the resistor, rim, tire and tube.

Figure 5 is a diagrammatic elevation of the tire showing the circumferential wire windings in dotted lines.

Figure 6 illustrates a segmental cross section of a tire containing the transverse wire windings, shown in dotted lines, and is a modified form of Figure 5.

Referring to the drawing, the numeral 1 designates a pneumatic tire, which is provided with wire windings 2, within its walls, each end of which terminates at the outside of the tire at the bead, one end 4 contacting an insulated source of supply 21 and the other end 3 grounding to the rim 22.

The variable resistor 5 is preferably of the carbon pile type, and is caused to change its resistance by variations of pressure within the tube 25, which contacts and presses against the resistor 5 at a point 6.

The resistor 5 is insulated from the rim 22 and all wires leading thereto and therefrom are also insulated from the rim. The numeral 7 designates the wire on the source side of the resistor connecting with the source of energy, through means of a point contact 8, and in the case of the rear wheels, through a brush connection 9 to the ammeter 23, thence through the ammeter to the battery 13. The wire 10, when used on the rear, connects the ammeter 23 with the brush 9 mounted on the axle, said brush being insulated from both the rear axle housing and the rear axle itself.

A second circuit is provided for the alarm 16, which remains open so long as the tire is maintained in normal driving condition, but which is closed by a break in the windings within the tire, due to a blowout, or over and under inflation of the tire. So long as a predetermined amount of current is permitted to flow through the circuit the ammeter hand remains neutral and does not operate the alarm circuit. The numeral 18 is the portion of the alarm circuit leading from high side ammeter hand contact, to the alarm 16, while 17 is the connection between the lower side ammeter hand contact and the alarm. 15 forms the connection between the alarm 16 and the source of energy, or battery 13.

Numeral 20 is the ground attached to the ammeter hand, and grounds the alarm circuit when the hand makes contact with either connection 17 or 18, caused by either a break in the main circuit or too small or great energy flow through the variable resistor 5.

Running the complete circumference of the inner side of one of the rim flanges, is an insulated ring 21 carrying a wire exposed to the bead of the tire, which will contact one of the exposed ends of the windings shown as 3 and 4, and connected by wire 5a to the far side of the resistor. The wire 5a is insulated from the rim 22. It is obvious that either of the exposed ends 3 or 4 may be used for the ground side or the current contact side.

The inner tube 25 contacts a plate, which forms a part of the resistor 5 and the pressure within the tube bearing on the plate increases or decreases the resistance, depending upon whether the pressure is low or high, and should the pressure go beyond or below predetermined limits, the ammeter hand 19 makes circuit with the alarm 16, thereby bringing the alarm into action. By grounding the resistor plate that contacts the inner tube, this device may be used without the tire winding feature, in which case the pressures alone would be registered on the ammeter and not the break in the tire 1.

A switch 24 is provided in order that the circuits to the tires may be broken, preventing a constant drain of amperage from the battery 13 during long periods of time, when the car is not in motion, for instance in the garage. This switch may be arranged to function with the ignition switch in order that when the ignition is locked all the tire circuits will be broken without further thought. Likewise when the ignition is turned on, the tire circuits are automatically put into action.

It would be unnecessary to investigate the condition of tires before entering the car, for the reason that the moment the ignition was turned on, the alarm would give warning, if any of the tires were in abnormal condition.

In many instances, the side walls of the tire proper start to bulge out before they actually blow out, and in this case the wire woven into the cord would break, opening that particular circuit and stopping the flow of current, causing the ammeter hand to contact the low side contact point, hereby closing the alarm circuit.

The ammeter dial can be provided with graduation marks in pounds intermediate the low and high contact points, so the reading of the pressure within the tube may be determined at any time.

Shown only in Figure 2 is a hook-up to be used on cars that are old and have not been provided with this invention at the factory. Cars now in use, and that have not been constructed with this unit in mind, may by this arrangement, have the unit assembled with very little effort. The spring actuating the point contact 8 is connected to an extension 10a which projects through the hub cap and which is insulated therefrom. Leading from this extension and rotatably mounted thereon, is the current carrying wire 10b leading to an insulated bracket 10d, mounted on the fender, thence to the source of supply. Between the bracket 10d on the fender, and the extension 10a, on the hub-cap, is a current carrying spring 10c, hooked between a break and the line 10b, in order that it will expand and contract with the action between the body and the wheels over a bumpy surface and the direction change of the front wheels, and keep the current supply line 10b under tension. This arrangement can be quickly removed to change tires or remove the wheel.

The invention having been set forth what is claimed as new and useful is:

In an alarm device, a pneumatic vehicle-tire, an electric conductor wound throughout the tire, a variable resistor, means for varying the resistance of the resistor in accordance with the air pressure in the tire, an ammeter, circuit means for connecting the electric conductor, resistor, and ammeter in series with a source of current, contacts on the ammeter positioned to be engaged by the ammeter pointer at predetermined minimum and maximum deflections, an alarm device and circuit means for actuating the alarm when the pointer engages either the minimum or maximum contact.

MARION W. GIESKIENG.